(12) United States Patent
Blom et al.

(10) Patent No.: US 7,987,366 B2
(45) Date of Patent: Jul. 26, 2011

(54) KEY MANAGEMENT FOR NETWORK ELEMENTS

(75) Inventors: Rolf Blom, Jarfalla (SE); Mats Naslund, Vallingby (SE); Elisabetta Carrara, Sollentuna (SE); Fredrik Lindholm, Alvsjo (SE); Karl Norrman, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1385 days.

(21) Appl. No.: 10/597,864

(22) PCT Filed: Feb. 11, 2004

(86) PCT No.: PCT/SE2004/000179
§ 371 (c)(1),
(2), (4) Date: Aug. 10, 2006

(87) PCT Pub. No.: WO2005/078988
PCT Pub. Date: Aug. 25, 2005

(65) Prior Publication Data
US 2007/0160201 A1    Jul. 12, 2007

(51) Int. Cl.
*H04L 9/32* (2006.01)
*H04L 9/30* (2006.01)
*H04L 9/08* (2006.01)

(52) U.S. Cl. ........ 713/171; 713/168; 713/172; 713/180; 713/181; 713/150; 380/278; 380/279; 380/284

(58) Field of Classification Search .................. None
See application file for complete search history.

(56) References Cited

U.S. PATENT DOCUMENTS

| | | | |
|---|---|---|---|
| 5,604,807 A * | 2/1997 | Yamaguchi et al. | 380/259 |
| 5,638,444 A | 6/1997 | Chou | |
| 6,336,188 B2 | 1/2002 | Blake-Wilson | |
| 7,243,366 B2 * | 7/2007 | Medvinsky et al. | 726/2 |
| 7,549,048 B2 * | 6/2009 | Freeman et al. | 713/171 |
| 2003/0081774 A1 * | 5/2003 | Lin et al. | 380/44 |
| 2004/0064706 A1 * | 4/2004 | Lin et al. | 713/182 |
| 2004/0153555 A1 * | 8/2004 | Haverinen et al. | 709/229 |
| 2007/0088950 A1 * | 4/2007 | Wheeler et al. | 713/170 |
| 2007/0094503 A1 * | 4/2007 | Ramakrishna | 713/172 |
| 2009/0292914 A1 * | 11/2009 | Liu et al. | 713/153 |
| 2010/0195824 A1 * | 8/2010 | Lin et al. | 380/44 |

* cited by examiner

*Primary Examiner* — Syed A. Zia
(74) *Attorney, Agent, or Firm* — Roger S. Burleigh

(57) ABSTRACT

The invention provides an establishment of a secret session key shared Between two network elements (NEa, NEb) belonging to different network domains (NDa, NDb). A first network element (NEa) of a first network domain (NDa) requests security parameters from an associated key management center (KMC) (AAAa). Upon reception of the request, the KMC (AAAa) generates a freshness token (FRESH) and calculates the session key (K) based on this token (FRESH) and a master key (KAB) shared with a second network domain (NDb). The security parameters are (securely) provided to the network element (NEa), which extracts the session key (K) and forwards the freshness token (FRESH) to the KMC (AAAb) of the second domain (NDb) through a second network element (NEb). Based on the token (FRESH) and the shared master key (KAB), the KMC (AAAb) generates a copy of the session key (K), which is (securely) provided to the second network element (NEb). The two network elements (NEa, NEb) now have shares the session key (K), enabling them to securely communicate with each other.

29 Claims, 8 Drawing Sheets

KEY MANAGEMENT FOR NETWORK ELEMENTS

TECHNICAL FIELD

The present invention generally refers to key management in communications systems, and in particular to inter-network domain key management for network infrastructure elements in such systems.

BACKGROUND

A communications environment or system can generally be envisaged as comprising a plurality of independent communication network domains. Each such network domain can provide access to its services for users connected thereto. In order to provide mobility within the communications environment and across different domains it is typically desirable to establish communications, in particular secure communications, between network elements (NEs) belonging to the different domains. A typical example of such a secure inter-domain communication between two network elements is a secure communication tunnel between Security Gateways (SEGs) of two telecommunication or network operators.

In order to provide secure communication between network elements of different networks domains, a key management/key exchange protocol is typically used to establish the security parameters necessary for the inter-NE communication. There exist different types of key management protocols in the prior art, and they can generally be divided into two classes: symmetric key and public key protocols, respectively. The former relies, in principle, on a secret key that is shared between the parties and cryptographic techniques based on such key(s). The latter makes use of a pair of keys per party (a secret key and a public key), a trusted third party "validating" public keys and public key cryptography techniques.

In a feasibility study to support Network Domain Security (NDS)/Internet Protocol (IP) evolution for 3G mobile network operators [1] a fully meshed symmetric solution for secure inter-SEG communication is disclosed. In the disclosure of [1] each SEG shares a long-term secret key with each exterior SEG, i.e. each SEG belonging to another network domain, it wishes to (securely) communicate with. If each domain has access to one SEG and n is the total number of SEGs in the communications environment housing the domains, the number of long-term keys to be distributed to the SEGs and stored in each SEG will amount to $$n\frac{n-1}{2}$$

if every SEG is to be able to communicate securely with every other SEG. Thus, the number of pre-shared secret keys can be very large and grows rapidly (with $n^2$) in dependence of the number of active SEGs in the network domains. In addition, it is expected that each network domain can have more than one communicating NE or SEG, and that the SEGs/NEs need to communicate with a relatively large number of other SEGs/NEs in other network domains. Also adding a new SEG to an existing network domain requires large workload in the form of key distribution, management and storage. In addition, if a single SEG is broken or hacked, all SEGs in the different network domains have to be updated and new long-term secret keys have to be distributed therebetween.

Another possible solution, briefly mentioned in [1], is to employ a trusted third party, typically called Key Distribution Center (KDC), common to all network domains that is to communicate securely. In such a case, the KDC shares a secret key with each network domain it has a service agreement with. In order to establish secure communication between two NEs or SEGs of different network domains, the KDC distributes a fresh secret (usually not the same as the shared secret) to the parties that need to communicate. Typical examples in prior art of this solution are the Kerberos-based key management protocols. However, a drawback is that it is typically hard to find a suitable trusted third party that can act as a KDC, in particular in the case of inter-operator communication. In addition, increased administrative work is required to arrange for a common trust of this trusted third party solution. The KDC is also a possible single point of failure, if it is compromised, all network domains using its services are threatened.

The preferred key agreement protocol according to [1], which is also discussed in [2], is to utilize a Public Key Infrastructure (PKI) based method, whereby the SEGs or NEs share their public keys. The document [1] discloses a certificate-based solution without a Bridge Certification Authority (CA) PKI, or with a Bridge CA PKI, which is also further discussed in [2]. In either solution, each operator, whose NEs or SEGs are to communicate, has to sign the other party's root certificate. These certificates are then securely configured in each communicating SEG.

A major drawback with PKI protocols is that the (initial) cost of establishing a PKI infrastructure is very large. Furthermore, revocations of certificates require manual administration and revocation checks must always be performed (a certificate is a credential that is valid unless a verification returns that it is revoked), which requires on-line communication between the operators' Certificate Revocation Lists (CRLs). Moreover, the cryptographic operations involved in PKI solutions are expensive.

SUMMARY

The present invention overcomes these and other drawbacks of the prior art arrangements.

It is a general object of the present invention to provide a secret shared between two network elements of different networks domains in a communications system or environment.

It is a particular object of the invention that the provision of the secret shared between the two network elements is performed in a simple, possibly partially manual, way.

It is another object of the invention to enable secure communication between network elements belonging to different network domains.

Yet another object of the invention is to reduce the number of long-term secret keys required for enabling secure communication between network elements belonging to different network domains.

A further object of the invention is provide a secret shared between two network elements of different network domains re-using existing network infrastructure and functionalities.

Still a further object of the invention is to avoid introducing any possible single point of failures, the compromise of which might render all inter-domain communication insecure.

These and other objects are met by the invention as defined by the accompanying patent claims.

Briefly, the present invention involves establishing a symmetric secret or session key shared between two network elements (NEs) belonging to different networks or network domains (NDs), typically managed by different network operators or service providers. This shared session key then enables the network elements to securely communicate with each other. Such a network element could be a charging node needing to contact a corresponding charging node of another network domain. Similarly, a secure channel has to be set up between two security gateways (network elements) of different network domains. A further example could be the communication between a Proxy Call State Control Function (P-CSCF) of a visited network domain and an Interrogating CSCF or a Serving CSCF of a home domain, traffic between Serving Gateway General Packet Radio System (GPRS) Support Nodes (SGSN) and Gateway GPRS Support Nodes (GGSN). In yet another example, the communicating network elements could be a Home Location Register (HLR) and a Visited Location Register (VLR) or, in general, any form of inter-domain signalling, e.g. using Signaling System No. 7 (SS7).

The session key establishment procedure of the invention is based on that the network domains, comprising the network elements needing to communicate, share a (long-term) secret key, denoted master key in following. This master key is preferably (securely) kept in a central key storage or repository in the network domain. The domain further includes cryptographic means or a cryptographic key management center (KMC) or module connected or associated with the key storage. This KMC includes functionalities and algorithms for performing key management and possibly authentication by means of the keys in the storage. In a preferred embodiment of the invention, the KMC constitutes or comprises the Authentication, Authorization and Accounting (AAA) server node of respective network domain.

The key establishment procedure generally starts with a network element (NEa) in a network domain A (NDa) requesting security parameters from its associated intra-ND KMC (AAAa). This request typically is accompanied by or includes an identifier of an external network element (NEb) in a network domain B (NDb) that the network element NEa wants to communicate with, or an identifier of the network domain NDb of this external network element NEb. Upon reception of the request, the AAAa generates a freshness token, which could be or include a random challenge, a timestamp and/or a sequence number. In addition, the AAAa identifies the relevant master key from the associated key repository based on the received identifier and generates a session key using a cryptographic function, typically, with the identified master key and generated freshness token as input parameters.

The generated freshness token and session key is then, preferably securely, provided to the network element NEa, which forwards the freshness token to the external network element NEb. This external network element NEb in turn forwards the received token to its associated KMC (AAAb), preferably accompanied by an identifier of the network element NEa or an identifier of the network domain NDa of network element NEa. Similar to above, the AAAb identifies the (same) correct master key from its associated key storage and generates a (identical) copy of the session key using an instance of the same cryptographic function as the AAAa of the other network domain NDa and the identified master key and received freshness token as input parameters.

The copy of the session key is then, preferably securely, provided to the network element NEb. The two network elements NEa and NEb now share a secret symmetric session key. This key may be employed directly for enabling secure communication between the network elements. For example, the session key can be used directly in Internet Protocol security (IPsec) protocols and algorithms. Alternatively, the session key could be used for running e.g. Internet Key Exchange (IKE) and negotiating Security Association (SA).

In a preferred embodiment of the invention, the session key establishment is performed by means of the Authentication and Key Agreement (AKA) algorithms and protocols provided in the AAA server node (KMC), preferably using a challenge-response scheme. It is then possible to connect the key establishment with an authentication procedure, where the communicating network elements may be authenticated. In such a case, in addition to the freshness token (typically a random challenge in case of challenge-response scheme) and session key, the AAAa calculates an expected response based on the master key and the random challenge. This expected response is then (securely) provided to the network element NEa together with the other security parameters (session key, random challenge). Upon reception of the random challenge (freshness token), the AAAb of the other network domain NDb generates a response based on the challenge and the master key, in addition to generating the copy of the session key. This response is then transmitted, via its associated network element NEb to the network element NEa, which compares the received response with the expected response value provided previously from its associated cryptographic means AAAa. If they correctly match, network element NEa authenticates network element NEb and considers the session key establishment successful.

In order to increase the security and allow both network domains (KMC of the domains) influence the generation of the session key, the challenge-response scheme could be repeated (interleaved) in the opposite direction. The shared generated session key(s) may then be a function of the keys generated in both directions. Similarly, the challenge and/or responses in respective direction could be interdependent.

The key storage of the each network domain houses the master key(s) shared with other domains. According to the invention, this storage only needs to keep one long-term master key per network domain pair. In other words, a network domain shares a first master key with a first external network domain and a second master key with a second external domain, etc. Contrary to these long-term master keys that basically only needs to be exchanged if a key storage is compromised, the lifetime of the generated session keys is comparatively much shorter. Thus, a session key is typically only valid during a communication session between network elements, or sometimes only during a portion of such a session. Moreover, should the key storage of a first domain be compromised only communication to that particular domain is potentially threatened, i.e. other network domains, e.g. a second and a third domain, can still securely inter-communicate.

The secret master keys used by the invention can be (securely) exchanged between the network domains (key repositories of the domains) in a number of different ways, for example using the Diffie-Hellman protocol, which can even be carried out manually between operator staff personnel, thereby providing the authentication of the Diffie-Hellman exchange. Thus, the most sensitive part of the establishment of the session key between two NEs can be performed manually, assuring authenticity by personal contact/exchange between operator or provider personnel.

The present invention facilitates adding/revoking a network element to/in an existing network domain. Basically, when adding a new network element, a secure channel is established between this new network element and the node(s) housing the cryptographic means. This is a configuration issue and can usually be done in combination with setting up the operation and maintenance channels to the new network element. Similarly, when a network element is revoked, the cryptographic means simply deletes the network element from its database of available network elements. Any (session) key cached in the network element is further erased.

Furthermore, if a key repository is hacked, the master keys in the key repository (and the corresponding copies of the master keys stored in repositories of other network domains) are simply updated, e.g. by anew performing the Diffie-Hellman or similar agreement protocol mentioned above. Indeed, to provide "backwards" security, the master key could be used in a bootstrap fashion to intermittently or regularly update or exchange new master keys between the domains. This has the advantage that the content of the domain key storage at a given time does not comprise older keys. Depending on the lifetime of the session keys, some or all network elements may need to be flushed from temporary stored session keys. This should be compared to the fully meshed symmetric solution discussed in the background section. In such a solution, if a single network element is hacked the keys of all network elements in all network domains (often several tens or hundreds of keys and network elements) may need to be replaced. However, by employing the present invention, if a network element is hacked, no key replacement has to be performed, though possibly a new session key has to be generated and provided if the network element currently is communicating with another external network element.

The invention offers the following advantages:
Reduces the number of long-term secret keys required to be distributed between and stored in network domains;
Provides re-utilization of existing network infrastructure and functionality by using the AAA server node and its AKA algorithms, markedly reducing the cost of implementing a key establishment between network elements;
Is more computationally efficient than PKI based protocols;
Provides replay protection and freshness in establishing shared session keys;
Provides easy revocation of network elements and network domains; and
Provides easy addition of network elements to existing network domains.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which.

DETAILED DESCRIPTION

Figure 1:
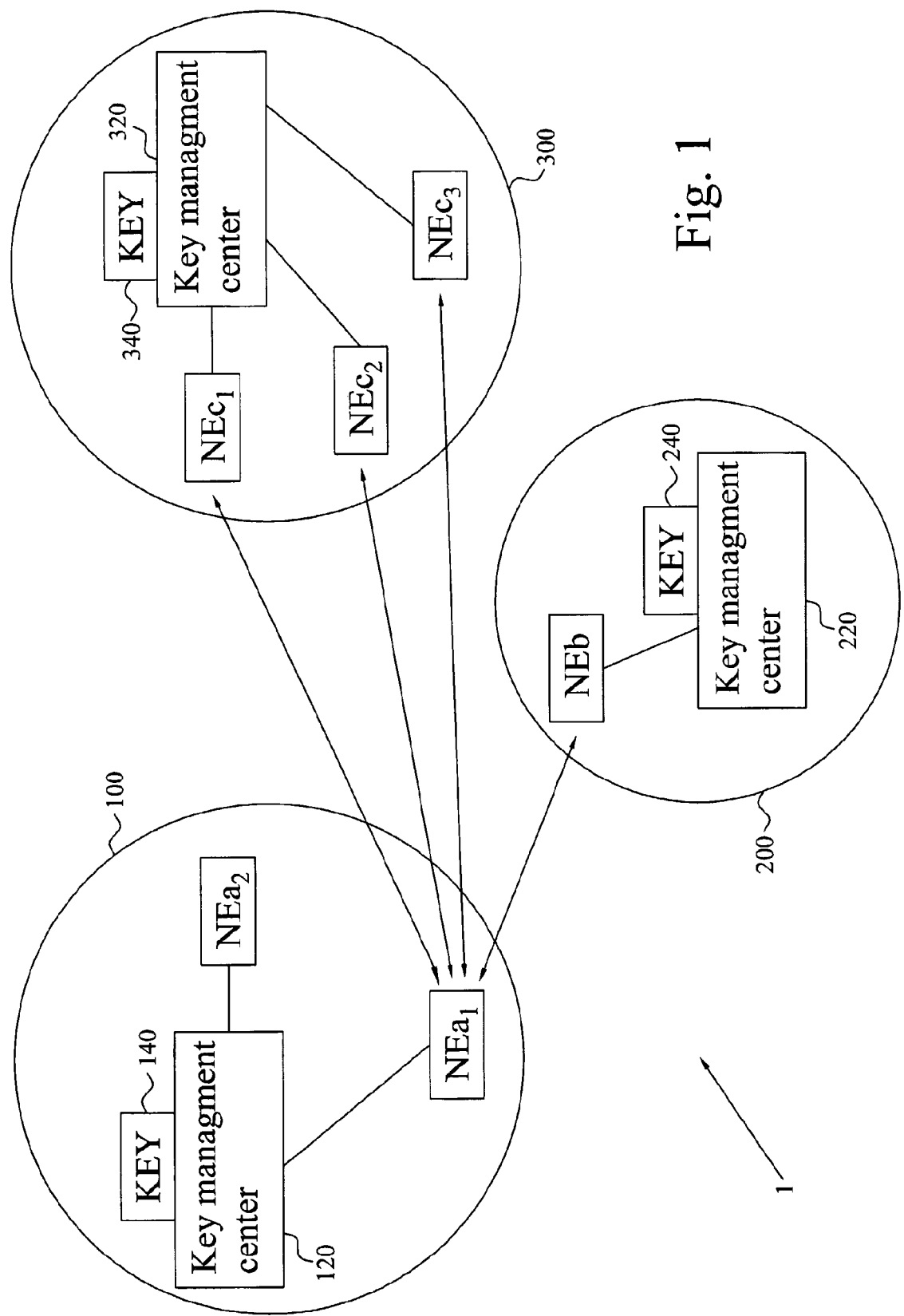
FIG. 1 is an overview of a communications system illustrated with three network domains according to the present invention.

Throughout the drawings, the same reference characters will be used for corresponding or similar elements.

The present invention relates to key management for establishing a shared secret key between two network elements of different networks or network domains in a communications system or environment. The invention also enables secure communication between the two network elements based on the established and shared secret key.

In order to facilitate understanding of the invention, in the present description a network is referred a number of connected or associated computers and/or network nodes having communications means and interconnections therebetween. A network domain or administrative network domain is (typically a portion of) a network governed by certain polices, defined by the administrator of the network. In the following, the invention will be described with reference to establishing a shared secret between two network elements of different network domains. However, as the person skilled in the art understands, the two network elements could, alternatively, belong to different administrative network domains and/or networks, and/or two domains of one and the same network. Furthermore, communication between networks is then referred to (if not pointed out otherwise) communication between network domains.

Referring to FIG. 1, a communications system 1 or environment is schematically illustrated. In the figure, the communications system 1 includes three independent network domains (NDs), denoted 100; 200 and 300, respectively. Each such network domain 100; 200; 300 is managed by a network operator or service provider and provides services to users connected to the network domain 100; 200; 300 and, possibly, having a service agreement, e.g. a subscription, with the network operator. In a typical example, each network operator manages one network domain 100; 200; 300, e.g. network domain 100 is managed by a first network operator, a second operator manages network domain 200, etc. However, it is possible for a single operator to manage two or more of the network domains 100; 200; 300 in the communications system 1.

The network domains 100; 200; 300 typically comprise a number of network elements (NE) or nodes $NEa_1$, $NEa_2$; NEb; $NEc_1$, $NEc_2$, $NEc_3$ that are able to conduct communication with network elements of the same domain and also with network elements of other external network domains, the latter case being of particular interest for the present invention. Such a network element $NEa_1$, $NEa_2$; NEb; $NEc_1$, $NEc_2$, $NEc_3$ could be a charging node needing to contact a corresponding charging node of another network domain. Similarly, a secure channel has to be set up between two Security Gateways (SEGs) (or network elements) of different network domains. A further example could be the communication between a Proxy Call State Control Function (P-CSCF) of a visited network domain and an Interrogating CSCF or a Serving CSCF of a home domain, traffic between Serving Gateway General Packet Radio System (GPRS) Support Nodes (SGSN) and Gateway GPRS Support Nodes (GGSN). In yet another example, the communicating network elements could be a Home Location Register (HLR) and a Visited Location Register (VLR) or, in general, any form of inter-domain signalling, e.g. using Signaling System No. 7 (SS7).

The network elements $NEa_1$, $NEa_2$; NEb; $NEc_1$, $NEc_2$, $NEc_3$ are typically fixedly arranged and constitute a portion of the infrastructure of respective network domain 100; 200; 300, allowing provision of different services to users connected to the network domain 100; 200; 300.

In addition to a number of network elements $NEa_1$, $NEa_2$; NEb; $NEc_1$, $NEc_2$, $NEc_3$, the network domain 100; 200; 300 includes cryptographic means or a (cryptographic) key management center (KMC) or module 120; 220; 320 and an associated central key repository or key distribution center 140; 240; 340. The KMC 120; 220; 320 provides keys managed and stored in the key repository 140; 240; 340, performs cryptographic functionalities, e.g. encryption and decryption, using these keys and authentication for the network domain 100; 200; 300 and its network elements $NEa_1$, $NEa_2$; NEb; $NEc_1$, $NEc_2$, $NEc_3$.

In the communication system 1, each network element $NEa_1$, $NEa_2$; NEb; $NEc_1$, $NEc_2$, $NEc_3$ may be configured for conducting communication with all or some of the network elements in the other network domains. For example, network element $NEa_1$ may communicate with network element NEb of network domain 200 and all the network elements $NEc_1$, $NEc_2$, $NEc_3$ of network domain 300. However, a network element may, alternatively, only be allowed to communicate with a limited number of the external network elements.

The network elements $NEa_1$, $NEa_2$; NEb; $NEc_1$, $NEc_2$, $NEc_3$ are also connected with the KMC 120; 220; 320 of respective network domain 100; 200; 300, preferably by means of a secure channel. Using such a secure channel the KMC 120; 220; 320 may provide keys and other sensitive information to its associated network elements $NEa_1$, $NEa_2$; NEb; $NEc_1$, $NEc_2$, $NEc_3$. A typical example of such a secure channel is an Operation and Management (O&M) channel between a network element $NEa_1$, $NEa_2$; NEb; $NEc_1$, $NEc_2$, $NEc_3$ and the KMC 120; 220; 320.

Figure 2:
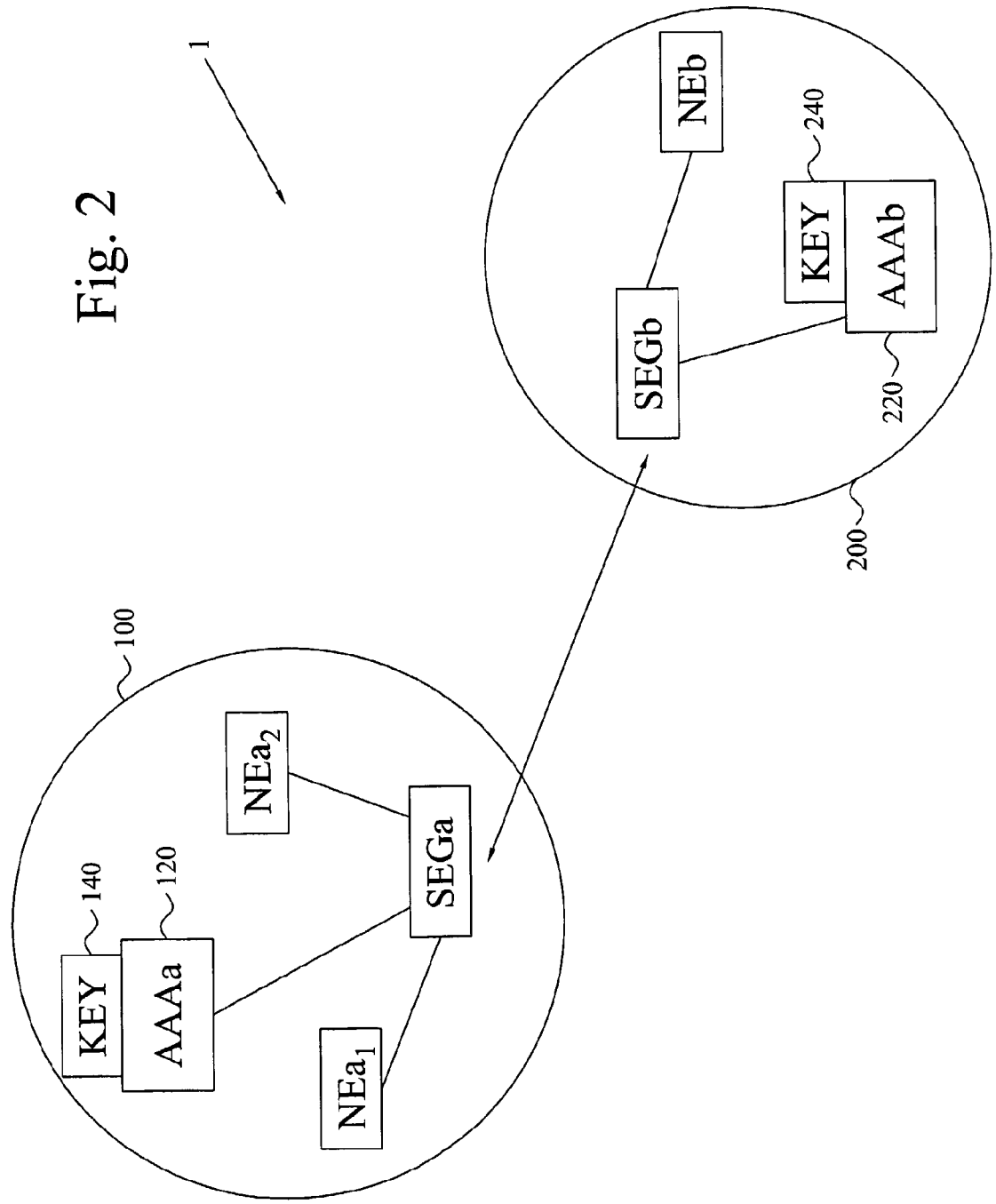
FIG. 2 is an illustration of an embodiment of a communications system according to the present invention.

In the following, which is further illustrated in the communication systems 1 of FIG. 2, the KMC will be instantiated by an Authentication, Authorization and Accounting (AAA) server node 120; 220 of the network domain 100; 200. The AAA server node 120; 220 typically includes functionalities and algorithms for generating and managing keys provided in associated key repositories 140; 240 in addition to authentication functionalities, e.g. by using an Authentication and Key Agreement (AKA) functionality or protocol.

Alternatively to FIG. 1, the network domain 100; 200 may include one or a few communicating network elements SEGa; SEGb dedicated for conducting communication with external communicating network elements. In FIG. 2, such dedicated network elements are exemplified by two security gateways SEGa; SEGb, adapted for mutual communication. In such a case, any protocols necessary for the communication may then be housed in only one or a few network elements in each network domain, instead of in all of the network elements of the domain. Any communication between two network elements $NEa_1$, $NEa_2$; NEb not adapted for inter-domain communication is then conducted in a proxy fashion through the security gateways SEGa; SEGb of FIG. 2. Use of designated SEGs is advantageous as security processing only needs to be implemented in the SEG (SEGa; SEGb), which then acts as a "security proxy" for other network elements $NEa_1$, $NEa_2$; NEb.

According to the present invention, the network domains, whose network elements are to communicate, share a secret symmetric key, denoted master key in the following. For example, referring back to FIG. 1, network domain 100 shares a master key ($K_{AB}$) with network domain 200 and another master key ($K_{AC}$) with domain 300. Similarly, network domain 200 and domain 300 share a master key ($K_{BC}$). These master keys are long-term shared keys that are secure kept, preferably, centrally at the key repository 140; 240; 340 of respective domain 100; 200; 300. The procedure of this master key establishment is discussed further below.

Once two network elements of different network domains are to securely communicate with each other, the KMC of respective domain generates a symmetric secret or session key and, preferably securely (relying on intra-domain security in the form of cryptography or in the form of physically protected links), provides it to its associated network element. The inter-NE communication may then be securely performed based on the session keys now present in the network elements. The generation of session key is discussed in more detail herebelow.

Figure 3:
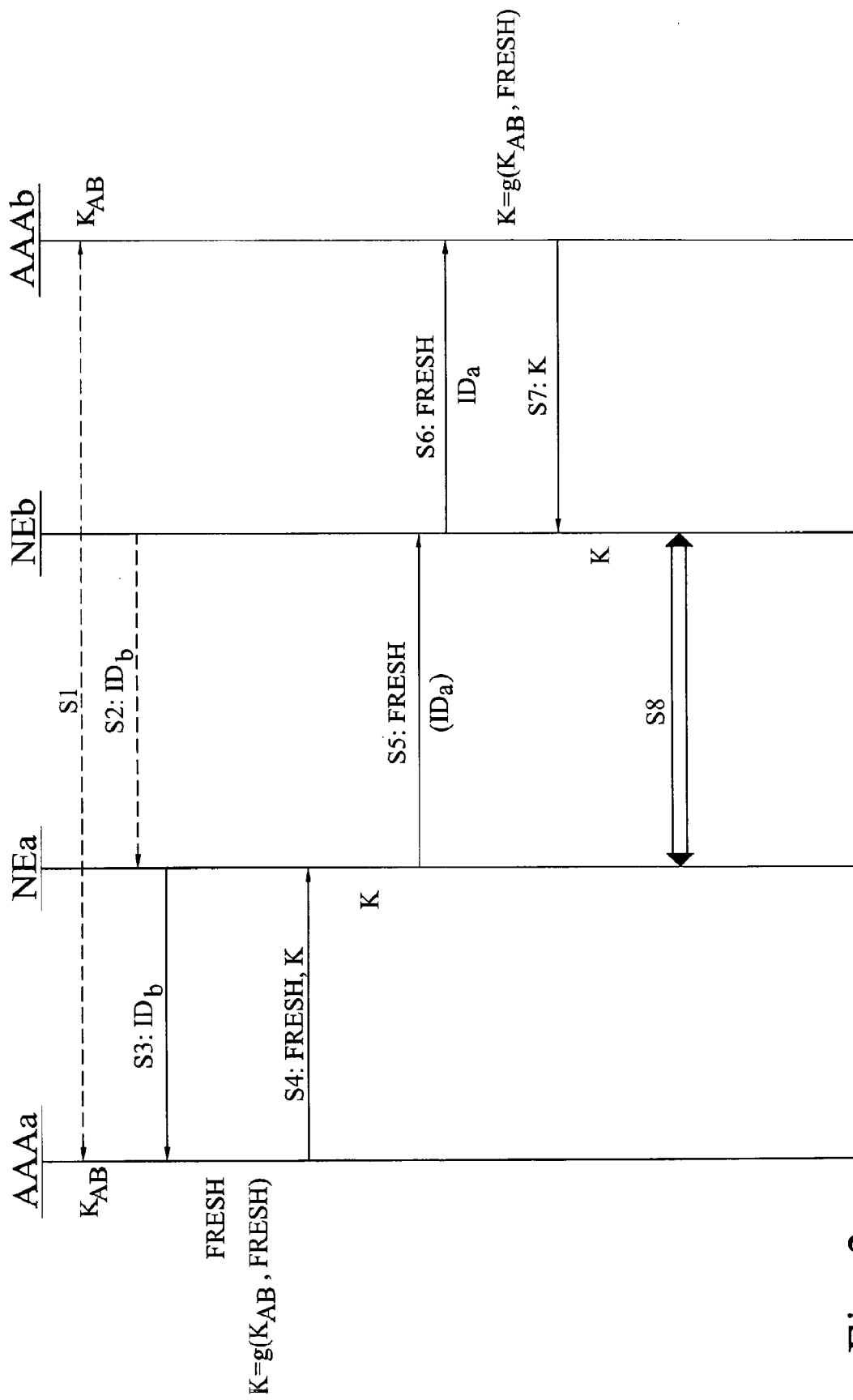
FIG. 3 is a schematic diagram of an embodiment of a session key establishment according to the present invention.

FIG. 3 schematically illustrates a method of establishing a session key shared by two network elements (NEa, NEb) of two network domains. The KMC or AAA-server (AAAa, AAAb) of the network domains have pre-shared a master key ($K_{AB}$) (step S1). In addition, respective AAA server node preferably has a secure (trusted) intra-domain channel towards its associated network element(s).

When NEa and NEb need to communicate, NEb may optionally trigger the communication by sending its identifier or an identifier of its network domain ($ID_b$) to NEa (step S2). Alternatively, NEa triggers the communication itself.

NEa issues a request to AAAa for security parameters for the communication with NEb. The request is accompanied by the identifier $ID_b$ (step S3).

In response to the request, AAAa generates or obtains a freshness token (FRESH). Furthermore, the relevant pre-shared master key $K_{AB}$ is identified based on the received identifier $ID_b$ and is provided typically from the associated key repository. Once the correct master key $K_{AB}$ is obtained, AAAa generates or calculates a session key (K) based on the generated freshness token FRESH, the master key $K_{AB}$ and some cryptographic function (g). Optionally, additional information, such as the identifiers of the network elements and/or domains $ID_a$, $ID_b$, may be used in this calculation.

The session key K and freshness token FRESH is then (securely) transmitted, preferably using the secure channel, to NEa (step S4).

NEa extracts the session key K from the received security parameters and forwards the freshness token FRESH to NEb, possible accompanied by its identifier or the identifier of its network domain ($ID_a$) (step S5).

NEb forwards the freshness token FRESH to its associated cryptographic KMC or AAAb together with the identifier $ID_a$, received from NEa or obtained elsewhere (step S6).

Similarly to AAAa, AAAb identifies and provides the relevant pre-shared master key $K_{AB}$ from its storage, e.g. in the associated key repository, based on the obtained identifier $ID_a$. Furthermore, AAAb generates an copy of the session key K using an instance of the same cryptographic function g as AAAa with the master key $K_{AB}$ and freshness token FRESH as input parameters.

The now generated (copy of) session key K is, preferably securely, transmitted to NEb (step S7).

At this point, the network elements NEa and NEb shares a secret symmetric session key K. This key may be employed directly for enabling secure communication between the network elements (step S8). For example, the session key can be used directly in Internet Protocol Security (IPsec) protocols and algorithms. Alternatively, the session key could be used for e.g. running Internet Key Exchange (IKE) and negotiating Security Association (SA).

By employing the above-identified method of the present invention, replay protection and freshness for the generation of session keys are provided. As was briefly mentioned above, the cryptographic function used for calculating the session key could also include other information as input parameters in addition to the master key and freshness token. For example, the identifier $ID_a$ and/or $ID_b$ could be possible additional input to the function.

The freshness token required for generating the session key could be generated by the AAA server node of the network domain or by some other unit or node connected thereto, including the communicating network element. The freshness token could be a time-stamp, e.g. a time-stamp associated with the time of reception of the request for security parameters from the network element, a sequence number and/or a random challenge, possibly associated with an authentication token.

The establishment of session keys may be accompanied by an authentication of the communicating network elements, e.g. using a challenge-response scheme. In such a case, the AAA server node could re-use the AKA algorithms traditionally employed for authenticating and key agreement between a network operator's AAA server and a user's mobile unit, or more precisely between the AAA server and an Identity Module, e.g. Subscriber Identity Module (SIM), arranged in the mobile unit.

Figure 4:
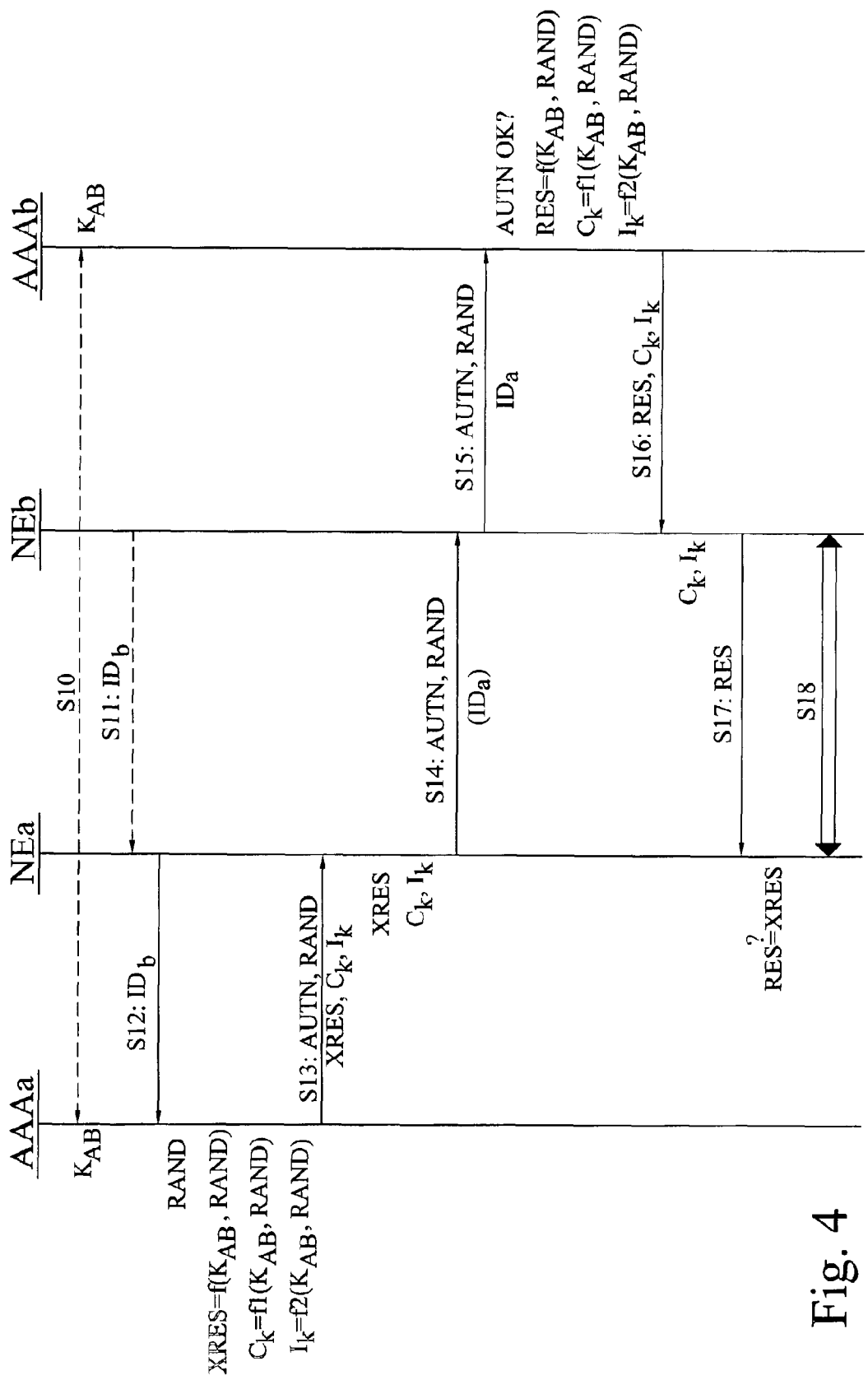
FIG. 4 is a schematic diagram of another embodiment of a session key establishment according to the present invention.

FIG. 4 schematically illustrates a session key establishment according to the present invention using a challenge-response procedure.

Correspondingly to FIG. 3, AAAa and AAAb pre-shares a secret master key $K_{AB}$ (step S10). The communication between the network elements may optionally be triggered by NEb providing its identifier or its domain identifier $ID_b$ to NEa (step S11). NEa transmits a request for security parameters to AAAa, typically, including the identifier $ID_b$ (step S12).

Upon reception of the request, AAAa identifies the relevant master key $K_{AB}$ based on the provided identifier $ID_b$ similarly to FIG. 3. In addition, AAAa generates an authentication vector (AV). In this embodiment, the AV is a quintuple of security and authentication parameters. Starting with a random challenge (RAND), generated by AAAa or elsewhere, and an authentication token (AUTN), generally constituting the freshness token of FIG. 3. The authentication token AUTN could be e.g. a (simple) counter or some cryptographically protected information, such as authenticated using a key based on the master key $K_{AB}$. Furthermore, an expected response (XRES) is generated using a cryptographic function (f) on the challenge RAND and master key $K_{AB}$. A cipher key ($C_k$) and integrity key ($I_k$) are also generated based on the master key $K_{AB}$ and challenge RAND, and possibly other optional information, as input to cryptographic function f1 and f2, respectively. In this embodiment $C_k$ and/or $I_k$ are used as session key(s). For more information of generation of the quintuple AV reference is made to [3], with the master key (or a key derived therefrom) as initial secret for the algorithms in [3].

The generated quintuple AV is then (securely) transmitted to NEa (step S13).

NEa extracts the random challenge RAND and authentication token AUTN form the received security parameters AV and forwards them, possibly together with its identifier or the identifier of its domain $ID_a$, to NEb (step S14).

Upon reception of the parameters, NEb forwards them to its associated AAAb server node (step S15).

AAAb identifies and retrieves the correct master key $K_{AB}$ from its storage based on the received identifier $ID_a$ and checks if the authentication token AUTN is ok. If the token AUTN was cryptographically protected by AAAa using its instance of the master key $K_{AB}$, AAAb employs the identified and provided master key $K_{AB}$ for authentication purposes. Furthermore, using instances of the same functions f, f1, f2 as AAAa, AAAb generates a response (RES) and the cipher $C_k$ and integrity $I_k$ keys.

The response RES and session keys ($C_k$, $I_k$) are then, preferably securely, transmitted to NEb (step S16).

The network element NEb forwards the received response RES to NEa (step S17), which now can authenticate NEb by comparing the received response RES with the expected response value XRES in the quintuple AV provided previously from AAAa. If they correctly match, NEa authenticates NEb and considers the session key establishment successful.

NEa and NEb now have access to the keys $C_k$ and $I_k$, which can be used as session keys e.g. for conducting secure communication between the network elements (step S18), as was discussed in connection with FIG. 3.

Thus, in this embodiment of the invention, the AAA server node and its AKA functionality and protocols are re-used for establishing session keys for network elements and for enabling secure communication between such elements of different network domains. Compared to the traditional role of the AAA server node in authenticating SIM of mobile telephones and other mobile units, the AAA node of the present invention will have two rolls. Firstly that of a normal AAA server (AAAa in FIG. 4) and that of SIM (AAAb in FIG. 4). In this context, NEa could be viewed as corresponding to an AAA proxy and NEb as a "mobile telephone". However, NEb and AAAb function as two separate network elements or nodes, whereas a mobile telephone and SIM are one integrated mobile unit.

In order to increase the security and allow both network domains (AAA of the domains) influence the generation of the session key, the challenge-response scheme of FIG. 4 could be repeated in the opposite direction. The shared generated session key(s) may then be a function of the keys generated in both directions.

Figure 5:
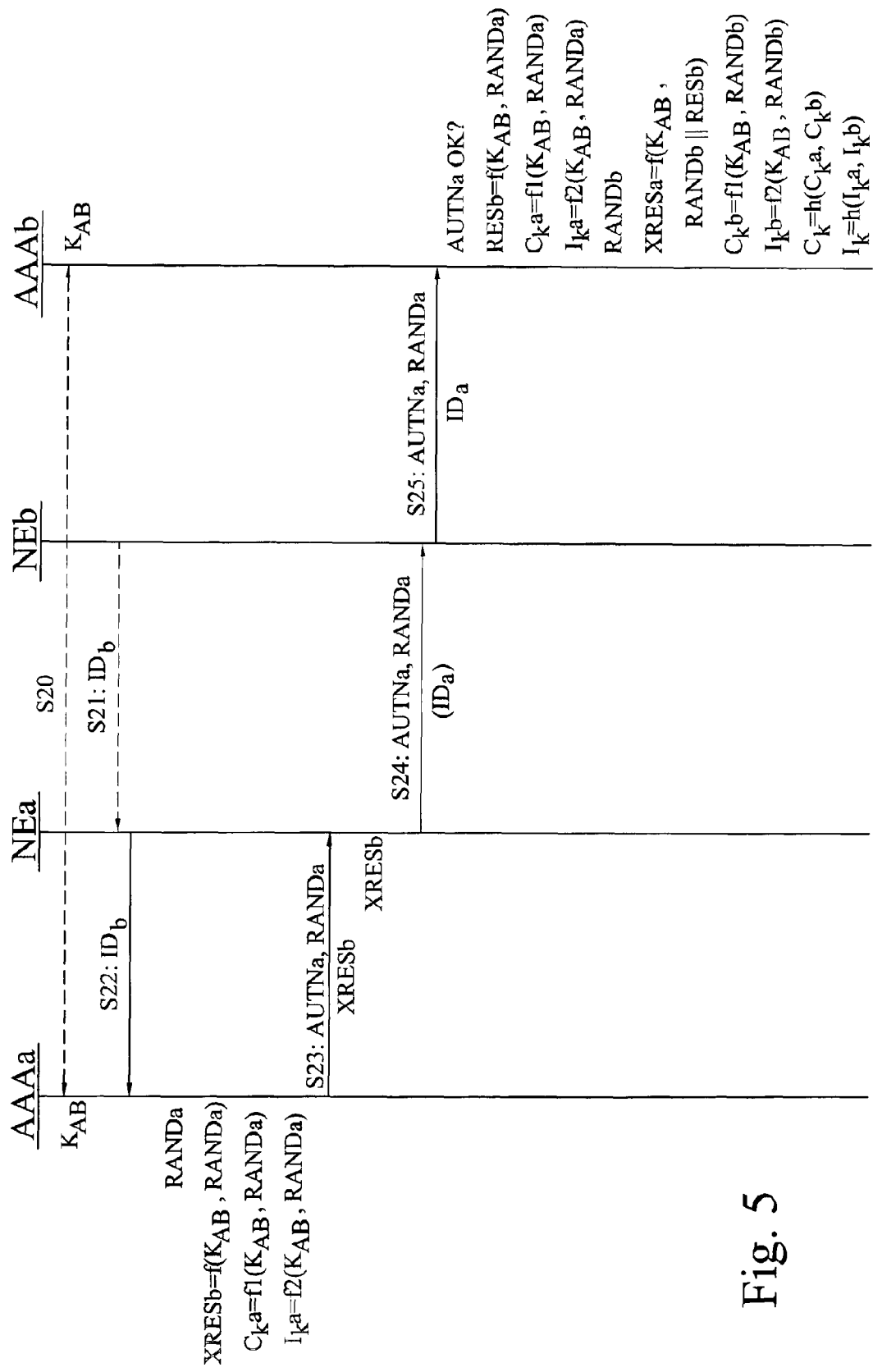
FIG. 5 is a schematic diagram of a further embodiment of a session key establishment according to the present invention.
Figure 6:
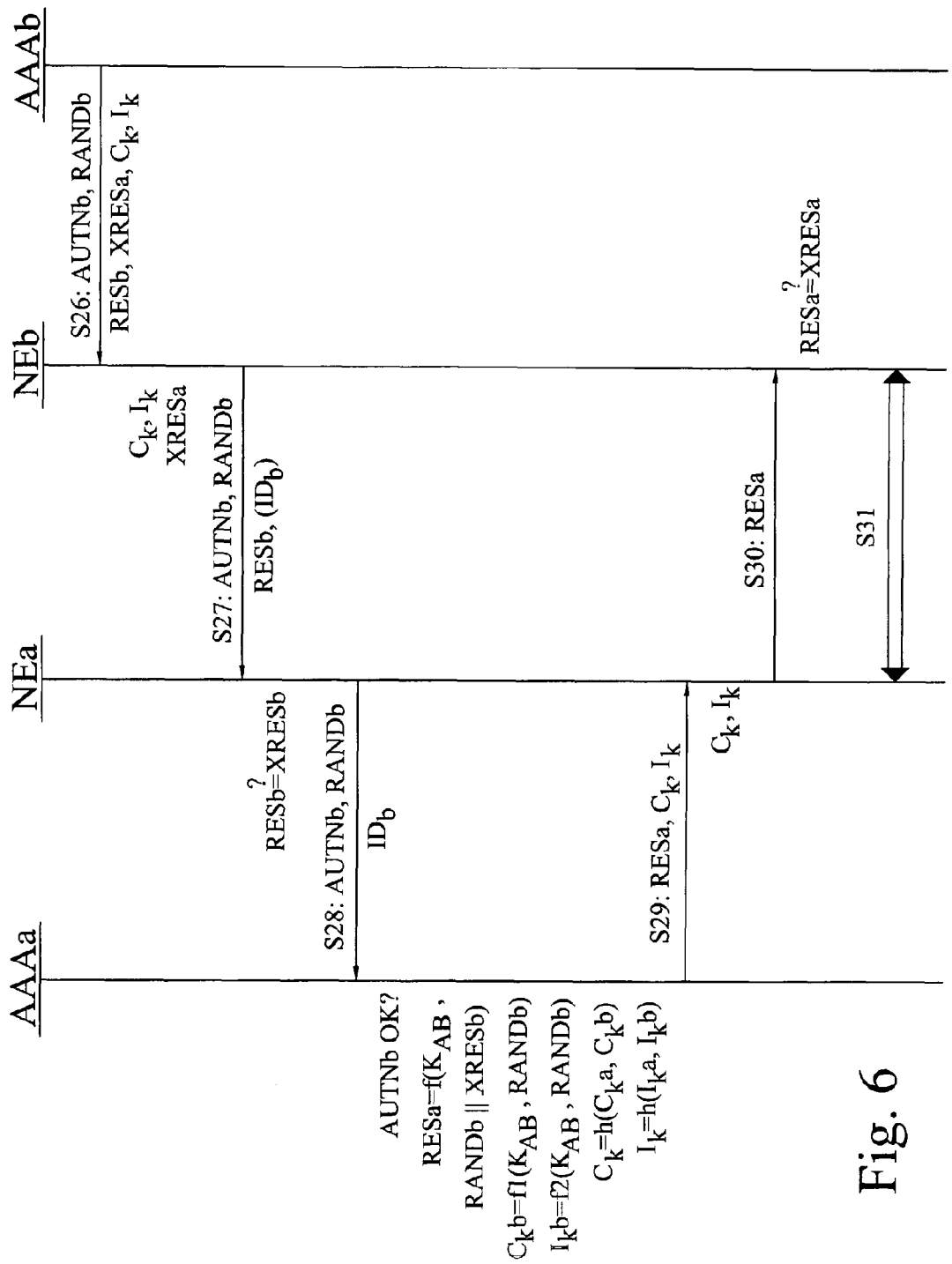
FIG. 6 is a schematic diagram continuing the session key establishment of FIG. 5.

FIGS. 5 and 6 schematically illustrates a possible solution for a double challenge-response procedure according to the present invention. Steps S20, S21 and S22 correspond to steps S1, S2 and S3 of FIG. 3 (steps S10, S11 and S12 of FIG. 4) and are not further discussed.

Upon reception of a request for security parameters from the associated network element NEa, AAAa generates or obtains a first random challenge (RANDa) and a first authentication token (AUTNa). Furthermore, AAAa identifies the correct master key $K_{AB}$ based on the received NEb or NDb associated identifier $ID_b$. A first expected response (XRESb) is calculated using a cryptographic function f and the identified master key $K_{AB}$ and provided first random challenge RANDa as input parameters. Correspondingly, the cryptographic means of the server node AAAa generates a first pre-cipher key ($C_k a$) and a first pre-integrity key ($I_k a$) by means of the master key $g^{xy}$, random challenge RANDa and cryptographic function f1 and f2, respectively. These keys $C_k a$, $I_k a$ are then stored in the server node, or in an associated accessible storage provided elsewhere, for later use.

The security parameters are then (securely) transmitted as a triplet authentication vector, comprising the first authentication token AUTNa, random challenge RANDa and expected response XRESb, to the network element NEa (step S23).

The network element NEa extracts and removes the first expected response XRESb from the authentication vector. The rest of the AV (i.e. AUTNa, RANDa) is then transmitted to the network element NEb possibly accompanied by its identifier of its domain identifier $ID_a$ (step S24).

The network element NEb forwards the authentication vector and the identifier $ID_a$ to its associated AAAb server node (step S25).

AAAb identifies and retrieves the correct master key $K_{AB}$ from its storage based on the received identifier $ID_a$ and investigates whether the first authentication token AUTNa is correct. Using instances of the same functions f, f1, f2 as AAAa, AAAb generates a first response (RESb) and the first pre-cipher $C_k$a and pre-integrity $I_k$a keys. AAAb also generates or obtains from some other unit in its network domain NDb a second random challenge (RANDb) and second authentication token (AUTNb). A second expected response (XRESa) is then calculated using function f and the master key $K_{AB}$ and a concatenation of the second random challenge RANDb and the first response RESb. It is anticipated by the invention that some other function, e.g. exclusive OR (XOR) and/or hash function, could be used instead of the concatenation. The provided second random challenge RANDb is also used, together with the master key $K_{AB}$ and cryptographic function f1 and f2, respectively, for generating a second pre-cipher key ($C_k$b) and a second pre-integrity key ($I_k$b). Finally, session key(s) represented by a cipher key $C_k$ and/or integrity key $I_k$ are generated based on the first and second pre-cipher keys $C_k$a, $C_k$b and the first and second pre-integrity keys $I_k$a, $I_k$b, respectively, and some function (h).

Continuing to FIG. 6, an authentication vector including the second authentication token AUTNb, second random challenge RANDb, first response RESb, second expected response XRESa and the cipher $C_k$ and integrity $I_k$ keys is, preferably securely, transmitted to the network element NEb (step S26).

The network element NEb extracts the cipher $C_k$ and integrity $I_k$ keys (session key(s)) and second expected response XRESa from the vector, the rest of which is then forwarded, possibly accompanied by the NEb or NDb identifier $ID_b$, to the network element NEa (step S27).

The network element extracts the first response RESb from the authentication vector and compares it to the first expected response XRESb received previously from AAAa. If they correspond or match, network element NEa considers the network element NEb successfully authenticated and forwards the authentication vector received from NEb to AAAa (step S28).

AAAa identifies the correct master key $g^{xy}$ based on the received NEb or NDb identifier $ID_b$ and verifies the second authentication token AUTNb. A second response (RESa) is then calculated using function f and the master key $K_{AB}$ and a concatenation of the received second random challenge RANDb and the first expected response XRESb (or first response RESb) as input parameters. This first expected response XRESb could be obtained from a storage in the AAAa server node, or in an associated storage. AAAa has then previously entered the expected response XRESb in the storage, e.g. in connection to generating it upon reception of the request for security parameters from the network element NEa, see FIG. 5. Alternatively, the first expected response XRESb or first response RESb could be provided from network element NEa together with the authentication vector transmitted in step S28. It is also possible for AAAa to anew calculate the first expected response XRESb by means of the first random challenge RANDa, as provided from a storage or from network element NEa.

In addition, AAAa generates the second pre-cipher key $C_k$b and pre-integrity key $I_k$b by means of the master key $K_{AB}$ and the received second random challenge RANDb as input parameters to functions f1 and f2, respectively. These calculated keys are used together with the previously generated and stored first pre-cipher key $C_k$a and pre-integrity key $I_k$a for generating the session key(s) (cipher key $C_k$ and/or integrity key $I_k$).

The generated second response RESa and the cipher $C_k$ and integrity $I_k$ keys are then, preferably securely, provided to the network element NEa (step S29).

The network element NEa extracts the keys ($C_k$, $I_k$) and forwards the second response RESa to the network element NEb (step S30).

Network element NEb compares this second response RESa with the second expected response XRESa received earlier from its associated AAAb server node. If they correspond, network element NEb has authenticated network element NEa and considers the session key establishment successful. The now shared secret cipher key $C_k$ and/or integrity key $I_k$ can be used as session key(s) e.g. for conducting secure communication between the network elements (step S31), as was discussed in connection with FIG. 3.

The double challenge-response procedure discussed above and in connection with FIGS. 5 and 6 should merely be seen as an example of such repeated challenge-response based session key establishment according to the present invention. In another embodiment, the second expected response and second response could be calculated with a concatenation, XOR and/or hash of the first and second random challenge as input parameters instead of, or as a complement to, a concatenation, XOR and/or hash of the second random challenge and the first response/expected response. Furthermore, AAAb could use a message authentication code (MAC) function on the second random challenge and an XOR value of the first and second integrity keys (or first and second cipher keys). The output (m'=MAC[($I_k$a XOR $I_k$b), RANDb]) from the MAC function could then be provided to AAAa (through steps S26, S27 and S28). AAAa then uses an instance of the same MAC function for calculating a corresponding output (m=MAC[($I_k$a XOR $I_k$b), RANDb). AAAa then verifies that the calculated output m corresponds to the received output m'.

The session key(s) generated according to the present invention could be used for cryptographically protecting the traffic between the two network elements during the duration of a whole communication session and is then discarded when the communication is over. Alternatively, the lifetime, during which the session key is valid, may be shorter than the duration of the communication session. For example, the key could be used only for initiating the secure inter-NE channel, where some other key, e.g. derived from the session key, is used for actually encrypting and decrypting information transmitted between the network elements. Alternatively, the session key could be used for transmitting only a certain amount of data, after which a new key establishment or portion thereof has to be performed. In either case, the total lifetime of the session key may be negotiated, e.g. during IKE, between the network elements or domains and may be determined in such a privacy negotiation.

Generally, the lifetime or valid time of a session key is comparatively much shorter than the corresponding lifetime of the long-term secret master key shared between two network domains. Whereas a new secret session key is, typically, generated for each communication session, or several times per session, the same master key is, preferably, used for several such communication sessions. Actually, the master keys only have to be exchanged if the storage (key repository), where the master keys are kept in respective domain, is broken. However, in some applications it may be advantageous from security point of view to intermittently update master keys, e.g. once a year, in the network domains. Indeed, to provide "backwards" security, the master key could be used in a bootstrap fashion to regularly or intermittently update or exchange new master keys between the domains. This has the advantage that the content of the key repository at a given time does not comprise older keys.

The agreement and sharing of master keys between the network domains in the communication systems may be implemented in various ways. However, one common misinterpretation is often that the agreement on a symmetric master key requires complicated (very high) security procedures. A typical example of a key agreement protocol for the master key that can be employed according to the present invention is the Diffie-Hellman (DH) agreement protocol. This protocol allows a robust and secure master key inter-ND establishment.

Figure 7:
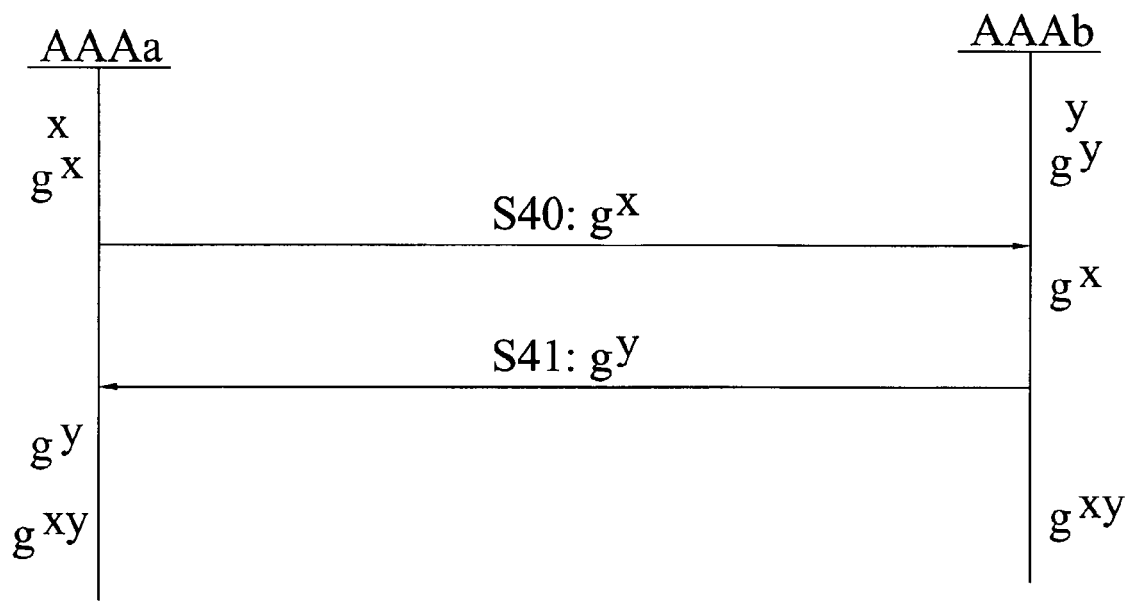
FIG. 7 is a schematic diagram of an embodiment of a master key agreement according to the present invention.

FIG. 7 schematically illustrates a Diffie-Hellman procedure for master key establishment according the present invention. In the figure, two network domains are to share a common master key. The two network domains, or AAA server nodes of the domains, each generates a secret key, x for AAAa and y for AAAb in FIG. 7. The secret key is then securely stored, e.g. in a tamper-resistant storage in the key repository of respective domain. The secret x; y preferably never should leave this secure storage. In addition, a corresponding public value of the secret x; y is calculated, denoted $g^x$ and $g^y$, respectively. Here, $g^x$ and $g^y$ refer to exponentiation operations (i.e. repeated group operations) in a suitable finite group. For more information refer to [4]. This key generation and calculation can be done at any time in advance of the actual master key agreement.

At the time of the master key establishment, e.g. at the time of signing a roaming agreement between the operators of the two network domains, the calculated public values $g^x$; $g^y$ are exchanged (step S40 and S41). This public value exchange is preferably performed in an authenticated way, e.g. by the operators' representatives exchanging floppy disks, each comprising a DH public value $g^x$; $g^y$ of the generated secret x; y. Alternatively, these values could be printed on paper in an Optical Character Recognition (OCR) friendly manner. Yet another approach is to use compact flash cards, Universal Serial Bus (USB) storage devices, etc., or the teaching of document [5].

The AAA server of respective network domain can then generate a common shared secret key (master key) $g^{xy}$ based on the exchanged public values $g^x$; $g^y$ and respective stored secret x; y. By employing the procedure described above and illustrated in FIG. 7, there is (under usual intractability assumptions on the Diffie-Hellman problem) absolutely no risk of revealing the master key $g^{xy}$, not even if both floppy disks are "sniffed" by an adversary. The authenticity of the exchange is verified visually by the respective operator representative. Thus, the most sensitive part of the session key establishment can be performed manually and assuring authenticity.

If a ND operator would like to revoke e.g. his roaming agreement with another network domain so that his network elements no longer should be able to securely communicate with the other ND operator's network elements, the master key shared with this external network domain is simply deleted from the key storage or repository. In addition, each time a network element requests security parameters, including the session key, from its AAA server node, it gives automatic check of revocation status of the correspondent network element and operator.

Furthermore, if any key repository is hacked, the master keys in the key repository (and the corresponding copies of the master keys stored in repositories of other network domains) are simply updated, e.g. by anew performing the Diffie-Hellman agreement protocol discussed above. Depending on the lifetime of the session keys, some or all network elements may need to be flushed from temporary stored session keys. This should be compared to the fully meshed symmetric solution discussed in the background section. In such a solution, if a single network element is hacked the keys of all network elements in all network domains (often several tens or hundreds of keys and network elements) may need to be replaced. However, according to the present invention if a network element is hacked, no key replacement has to be performed, though possibly a new session key has to be generated and provided if the network element currently is communicating with another external network element. Moreover, returning briefly to FIG. 1, should the key storage 140 of the network domain 100 be compromised only communication to that particular domain 100 is potentially threatened, i.e. other network domains, e.g. the domain 200 and the domain 300, can still securely inter-communicate.

When a new network element is added to an existing network domain, basically the only measure required is the establishment of a, preferably secure, channel between this new network element and the AAA node. This is a configuration issue. No further distribution of keys or certificates is required. Similarly, when a network element is to be revoked from a network domain, the AAA node simply deletes the network element (the key used for the secure channel between AAA and the network element) from its database of available network elements, to which it has a (secure) channel. Any (session) key cached in the network element is further erased.

Figure 8:
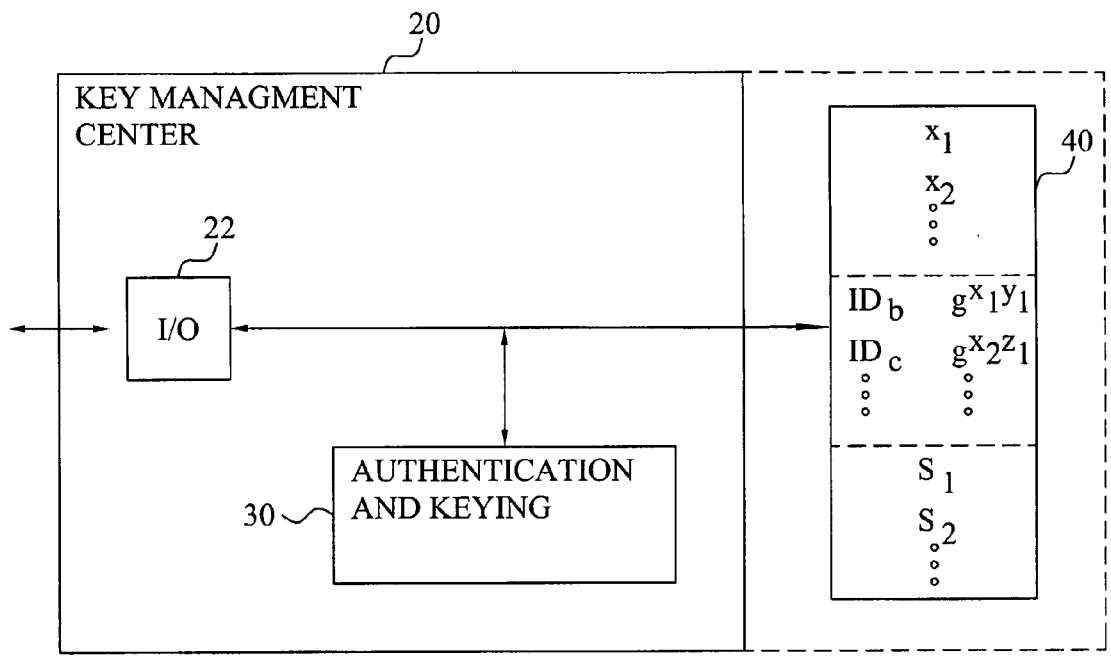
FIG. 8 is a block diagram of an embodiment of (cryptographic) key management center (KMC) according to the present invention.

FIG. 8 is a schematic block diagram of a (cryptographic) key management center (KMC) or module (AAA server) 20 according to the present invention illustrated associated with a key repository 40. The KMC 20 generally includes an input and output (I/O) unit 22 for managing communication with external units, nodes and elements. In particular, the I/O unit 22 is adapted for receiving requests for security parameters, possibly including a NE or ND identifier, from an associated network element, for (securely) transmitting requested security parameters (including the session key) to a requesting network element and for reception of a freshness token from a intra-ND network element. The KMC 20 further includes an authentication and keying unit 30, typically comprising AKA functionality for performing key management and possibly authentication.

The units 22, 30 of the KMC 20 may be provided as software, hardware or a combination thereof. They may be implemented together for example in a network node in the network domain. Alternatively, a distributed implementation is also possible with some of the units provided in different network nodes.

The KMC 20 comprises, is connected to or associated with the (central) key repository or storage 40 of the network domain. The repository 40 typically includes a set of secrets ($x_1, x_2, \ldots$) used for generating DH public values and master keys. In a first embodiment only one secret is used for generating the required master keys shared with other network domains. However, one secret is preferably only used for generating one master key. In other words, if a network domain is to share master keys with two other network domains it preferably generates to two different secrets ($x_1$, $x_2$), where the first ($x_1$) is used for calculating the master key shared with the first domains and the other secret ($x_2$) is employed for generating the master key shared with the second domain.

The repository 40 also comprises a set of master keys ($g^{x_1 y_1}$, $g^{x_2 z_1}$, ...) (or more generally, representations of master keys, e.g. obtained by hashing each Diffie-Hellman value) associated with identifiers ($ID_b$, $ID_c$, ...) of the relevant network domain, with which it shares the master keys. The identifier and master key association allows identification of correct master key based on information of the identifier.

Preferably, also a set of secret keys ($S_1$, $S_2$, ...) used for secure communication between the KMC 20 and its associated network elements is stored in the repository 40. A corresponding copy of the relevant secret key is then stored also in the network element. It could be possible to use one and the same secret key for the secure communication between the AAA node and all its associated network elements. However, it may be preferred to use one secret only for a group of network elements or a single network element.

The key repository 40 could be provided as a stand-alone node in the communication domain and (securely) connected to the KMC 20. Alternatively, the repository 40 and KMC 20 may be implemented in one and the same network node. Also a distributed implementation is possible, where the different set of keys are provided in different nodes, e.g. the master keys ($g^{x_1 y_1}$, $g^{x_2 z_1}$, ...) are provided in one node, the secrets ($x_1$, $x_2$, ...) used for generating the master keys in a second node and the secrets ($S_1$, $S_2$, ...) employed for the secure communication with the network elements in a third node, e.g. the AAA server node. However, in the present invention the KMC (AAA server node) 20 and the key repository 40 could for clarity be regarded as one logic unit in the network domain, even if implemented in separate nodes. In either way, the key storage 40 is preferably tamper-resistant rendering it more difficult to break. Furthermore, secrets and keys preferably should preferably not leave the secure environment unprotected.

Figure 9:
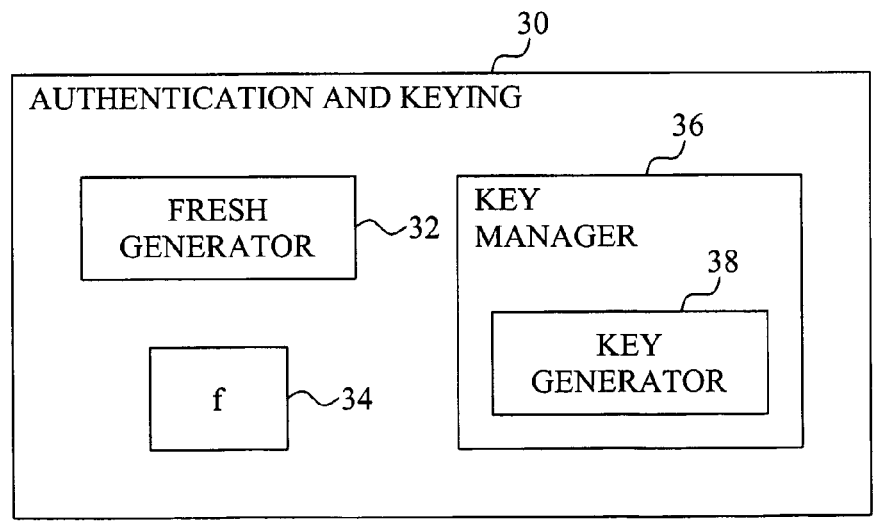
FIG. 9 is a block diagram of an embodiment of an authentication and keying unit of the KMC of FIG. 8.

FIG. 9 is a block diagram illustrating the authentication and keying unit 30 of FIG. 8 in more detail. The authentication and keying unit 30 generally comprises a freshness token generator 32. Depending on the type of freshness token employed in the session key establishment procedure of the invention, the generator 32 could be implemented as a random challenge generator, sequence number counter, time-stamping unit, etc. Alternatively, this token generator 32 could be provided elsewhere in the network domain, including in a network element. Further, the unit 30 may optionally include a cryptographic functionality 34 for generating an expected response or response by means of the freshness token from the generator 32 and a master key from the key storage. Also a key manager 36 is implemented in the authentication and keying unit. The manager 36 in particular includes functionality 38 for generating keys, including generating master keys, generating secrets used for generating master keys, generating DH public values and generating or calculating session keys. In particular in the case of session key generation, the key generator 38 could use a single cryptographic function. Alternatively, a unique cryptographic function could be used for each network domain so that each network domain pair shares one unique function. The key manager 36 also typically manages key deletion and replacement or updatings in the key repository, and possible in the associated network elements, such by sending a key storage flushing command to the network elements and key storage.

The units 32, 34, 36, 38 of the authentication and keying unit 30 may be provided as software, hardware or a combination thereof. They may be implemented together for example in a network node in the network domain. Alternatively, a distributed implementation is also possible with some of the units provided in different network nodes.

Figure 10:
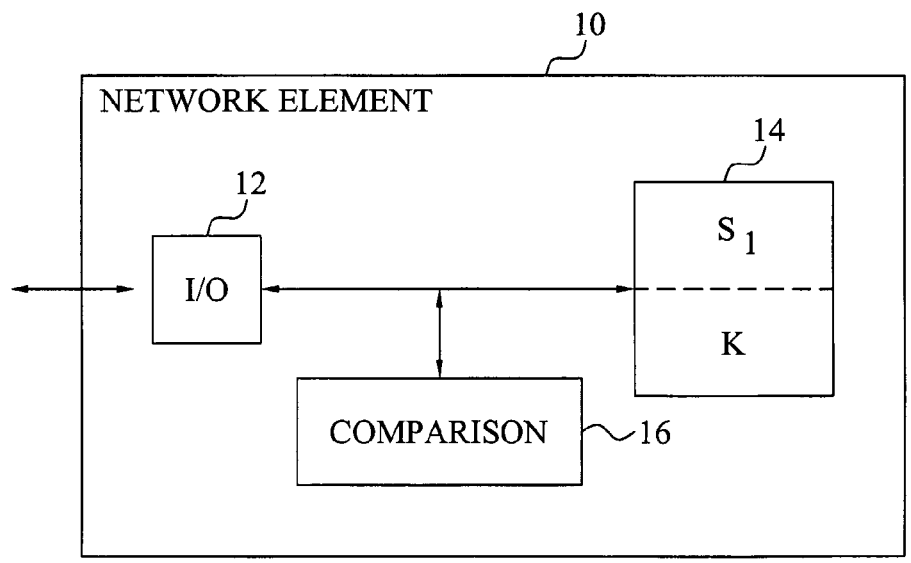
FIG. 10 is a block diagram of an embodiment of a network element according to the present invention.

FIG. 10 is a schematic block diagram of a network element or node 10 according to the present invention. The network element 10 includes an I/O unit 12 for communicating with the associated AAA server node (KMC) and with external network elements of other network domains. A key storage 14 is also preferably arranged in the network element for (temporarily) storing session keys (K). Also the secret key ($S_1$) shared with the AAA server and used for secure communication therewith may be housed in the storage 14. The key storage 14 is preferably tamper-resistant making it harder to hack or break for an adversary. Optionally, a comparison unit 16 may be provided in the network element 10 for comparing an expected response received in the authentication vector (security parameters) from the AAA server with the response from an external network element. Based on the comparison performed by the unit 16, the network element 10 may authenticate the external network element, with which it wants to securely communicate. Although not illustrated in the figure, a key manager for deleting session keys when their lifetime has expired and/or flushing the key storage 14 upon reception of a key flushing command from the AAA server node may be implemented in the network element.

The units 12, 16 of the network element 10 may be provided as software, hardware or a combination thereof.

It will be understood a person skilled in the art that various modifications and changes may be made to the present invention without departure from the scope thereof, which is defined by the appended claims.

REFERENCES 1 3GPP TR 33.810 V6.0.0, 3$^{rd}$ Generation Partnership Project; Technical Specification Group Services and System Aspects; 3G Security; Network Domain Security/Authentication Framework (NDS/AF); Feasibility study to support NDS/IP evolution, December, 2002.
2 3GPP TS 33.310 V0.30, 3$^{rd}$ Generation Partnership Project; Technical Specification Group Services and System Aspects; Network Domain Security; Authentication Framework, May, 2003.
3 3GPP TS 33.102 V5.2.0, 3$^{rd}$ Generation Partnership Project; Technical Specification Group Services and System Aspects; 3G Security; Security architecture, June, 2003.
4 A. J. Menezes, P. C. van Oorschot and S. C. Vanstone, "Handbook of Applied Cryptography", CRC Press, 1996.
5 ISO/IEC 9798-6, "Information technology, Security techniques, Entity authentication, Part 6: Mechanisms using manual data transfer", Working draft, April, 2003.

The invention claimed is:

1. A method of establishing a session key shared between a first network element of a first network domain and a second network element of a second network domain, said first network domain comprising first cryptographic means and means for sharing a secret key with said second network domain comprising second cryptographic means, said method comprising the steps of:

said first cryptographic means generating a freshness token;

said first cryptographic means generating said session key based on said shared secret key and said generated freshness token;

providing said session key (K) to said first network element;

providing said freshness token to said second cryptographic means;

said second cryptographic means generating a copy of said session key based on said shared secret key and said provided freshness token; and, providing said copy of said session key to said second network element.

2. A method of enabling secure communication between a first network element of a first network domain and a second network element of a second network domain, said first network domain comprising first cryptographic means and means for sharing a secret key with said second network domain comprising second cryptographic means, said method comprising the steps of:

said first cryptographic means generating a freshness token;

said first cryptographic means generating said session key based on said shared secret key and said generated freshness token;

providing said session key to said first network element;

providing said freshness token to said second cryptographic means;

said second cryptographic means generating a copy of said session key based on said shared secret key and said provided freshness token;

providing said copy of said session key to said second network element; and, said first network element and said second network element securely communicating based on said session key and said copy of said session key.

3. The method according to claim 1, wherein said session key providing step comprises the step of securely providing said session key to said first network element and said session key copy providing step comprises the step of securely providing said copy of said session key to said second network element.

4. The method according to claim 1, wherein said freshness token comprises a random challenge and said method further comprises the steps of:

said first cryptographic means generating an expected response based on said shared secret key and said random challenge;

providing said expected response to said first network element;

said second cryptographic means generating a response based on said shared secret key and said provided random challenge;

providing said response to said first network element; and, said first network element authenticating said second network element based on a comparison between said expected response and said response.

5. The method according to claim 4, wherein said first cryptographic means comprises an Authentication and Key Agreement (AKA) algorithm for generating said random challenge, said expected response and said session key, and said second cryptographic means comprises an AKA algorithm for generating said response and said copy of said session key.

6. The method according to claim 1, further comprising the steps of:

said first network element providing an identifier associated with said second network domain to said first cryptographic means; and, said second network element providing an identifier associated with said first network domain to said second cryptographic means.

7. The method according to claim 6, wherein said session key and said copy of said session key are generated based on at least one of said identifier associated with said first network domain and said identifier associated with said second network domain.

8. The method according to claim 6, further comprising the steps of:

said first cryptographic means identifying said shared secret key based on said identifier associated with said second network domain; and, said second cryptographic means identifying said shared secret key based on said identifier associated with said first network domain.

9. The method according to claim 1, wherein said first cryptographic means is an Authentication, Authorization and Accounting (AAA) server provided in a network node of said first network domain and second cryptographic means is an AAA server provided in a network node of said second network domain.

10. The method according to claim 1, wherein said first network domain shares a second secret key with a third network domain comprising third cryptographic means and at least a third network element.

11. The method according to claim 1, wherein said first network domain is managed by a first communications network operator and said second network domain is managed by a second different communications network operator.

12. The method according to claim 1, further comprising the step of intermittently replacing said shared secret by a new shared secret by basing a key agreement between said first network domain and said second network domain on said shared secret.

13. A system of establishing a session key shared between a first network element of a first network domain and a second network element of a second network domain, said first network domain sharing a secret key with said second network domain, wherein said first network domain comprises:

first cryptographic means for generating a freshness token and for generating a session key based on said shared secret key and said generated freshness token;

means for providing said session key from said first cryptographic means to said first network element; and, means for providing said freshness token to said second network domain; wherein said second network domain comprises:

second cryptographic means for generating a copy of said session key based on said shared secret key and said provided freshness token; and, means for providing said copy of said session key from said second cryptographic means to said second network element.

14. A system of enabling secure communication between a first network element of a first network domain and a second network element of a second network domain, said first network domain sharing a secret key with said second network domain, wherein said first network domain comprises:

first cryptographic means for generating a freshness token and for generating a session key based on said shared secret key and said generated freshness token;

means for providing said session key from said first cryptographic means to said first network element; and, means for providing said freshness token to said second network domain; said second network domain comprises:

second cryptographic means for generating a copy of said session key based on said shared secret key and said provided freshness token; and, means for providing said copy of said session key from said second cryptographic means to said second network element, said first network element comprises means for conducting secure communication with said second network element based said session key and said second network element comprises means for conducting secure communication with said first network element based on said copy of said session key.

15. The system according to claim 13, wherein said session key providing means is adapted for securely providing said session key from said first cryptographic means to said first network element and said session key copy providing means is adapted for securely providing said copy of said session key from said second cryptographic means to said second network element.

16. The system according to claim 13, wherein said freshness token comprises a random challenge and said first cryptographic means comprises means for generating an expected response based on said shared secret key and said random challenge and said second cryptographic means comprises means for generating a response based on said shared secret key and said random challenge, said first network domain comprises means for providing said expected response to said first network element and said second network domain comprises means for providing said response to said first network element, wherein said first network element comprises means for authenticating said second network element based on a comparison between said expected response and said response.

17. The system according to claim 16, wherein said first cryptographic means comprises an Authentication and Key Agreement (AKA) algorithm for generating said random challenge, said expected response and said session key, and said second cryptographic means comprises an AKA algorithm for generating said response and said copy of said session key.

18. The system according to claim 13, wherein said first cryptographic means is an Authentication, Authorization and Accounting (AAA) server provided in a network node of said first network domain and said second cryptographic means is an AAA server provided in a network node of said second network domain.

19. The system according to claim 13, further comprising a third network domain with third cryptographic means and at least a third network element, said first network domain and said third network domain share a second secret key.

20. The system according to claim 13, wherein said first network domain is managed by a first communications network operator and said second network domain is managed by a second different communications network operator.

21. The system according to claim 13, further comprising means for intermittently replacing said shared secret by a new shared secret, said shared secret replacing means is adapted for replacing said shared secret based on a key agreement between said first network domain and said second network domain using said shared secret.

22. A network domain comprising:
a first network element adapted for communication with a second network element of an external network domain, wherein said network domain and said external network domain sharing a secret key;
cryptographic means for generating a freshness token and for generating a session key based on said shared secret key and said generated freshness token;
means for providing said session key from said cryptographic means to said first network element; and,
means for providing said freshness token to said external network domain, wherein said external network domain comprises means for generating a copy of said session key for said second network element based on said shared secret key and said provided freshness token.

23. The network domain according to claim 22, wherein said session key providing means is adapted for securely providing said session key from said cryptographic means to said first network element.

24. The network domain according to claim 22, wherein said freshness token comprises a random challenge and said cryptographic means comprises means for generating an expected response based on said shared secret key and said random challenge and said external network domain comprises means for generating a response based on said shared secret key and said random challenge, said network domain comprises means for providing said expected response to said first network element and said external network domain comprises means for providing said response to said first network element, wherein said first network element comprises means for authenticating said second network element based on a comparison between said expected response and said response.

25. The network domain according to claim 22, wherein said cryptographic means is an Authentication, Authorization and Accounting (AAA) server provided in a network node of said network domain.

26. A network domain comprising:
a first network element adapted for communication with a second network element of an external network domain, wherein said network domain and said external network domain sharing a secret key;
cryptographic means for generating a session key based on said shared secret key and a freshness token provided from said external network domain; and,
means for providing said session key from said cryptographic means to said first network element, wherein said external network domain comprises means for generating said freshness token and for generating a copy of said session key for said second network element based on said shared secret key and said generated freshness token.

27. The network domain according to claim 26, wherein said session key providing means is adapted for securely providing said session key from said cryptographic means to said first network element.

28. The network domain according to claim 26, wherein said freshness token comprises a random challenge and said cryptographic means comprises means for generating a response based on said shared secret key and said random challenge and said external network domain comprises means for generating an expected response based on said shared secret key and said random challenge and means for providing said expected response to said second network element, said network domain comprises means for providing said response to said second network element, wherein said response and said expected response enables said second network element to authenticate said first network element.

29. The network domain according to claim 26, wherein said cryptographic means is an Authentication, Authorization and Accounting (AAA) server provided in a network node of said network domain.

* * * * *

UNITED STATES PATENT AND TRADEMARK OFFICE
CERTIFICATE OF CORRECTION

PATENT NO. : 7,987,366 B2
APPLICATION NO. : 10/597864
DATED : July 26, 2011
INVENTOR(S) : Blom et al.

It is certified that error appears in the above-identified patent and that said Letters Patent is hereby corrected as shown below:

On the Face Page, in Field (75), under "Inventors", in Column 1, Line 1, delete "Jarfalla" and insert -- Järfälla --, therefor.

On the Face Page, in Field (75), under "Inventors", in Column 1, Line 1, delete "Naslund," and insert -- Näslund, --, therefor.

On the Face Page, in Field (75), under "Inventors", in Column 1, Line 2, delete "Vallingby" and insert -- Vällingby --, therefor.

On the Face Page, in Field (75), under "Inventors", in Column 1, Line 4, delete "Alvsjo" and insert -- Älvsjö --, therefor.

On the Face Page, in Field (57), under "ABSTRACT", in Column 2, Line 2, delete "Between" and insert -- between --, therefor.

In Fig. 1, Sheet 1 of 8, for Tag "120", in Line 1, delete "managment" and insert -- management --, therefor.

In Fig. 1, Sheet 1 of 8, for Tag "320", in Line 1, delete "managment" and insert -- management --, therefor.

In Fig. 1, Sheet 1 of 8, for Tag "220", in Line 1, delete "managment" and insert -- management --, therefor.

In Fig. 8, Sheet 8 of 8, for Tag "20", in Line 1, delete "MANAGMENT" and insert -- MANAGEMENT --, therefor.

In Column 5, Lines 1-5, delete "the operation.........further erased." and insert the same in Column 4, at Line 67, after "setting up" as a continuation paragraph.

Signed and Sealed this
Twenty-fourth Day of January, 2012

David J. Kappos
*Director of the United States Patent and Trademark Office*

CERTIFICATE OF CORRECTION (continued)
U.S. Pat. No. 7,987,366 B2

In Column 12, Line 44, delete "RANDb)." and insert -- RANDb]). --, therefor.

In Column 16, Line 52, delete "van" and insert -- Van --, therefor.

In Column 19, Line 14, in Claim 14, delete "based" and insert -- based on --, therefor.